(12) United States Patent
Hazenbroek et al.

(10) Patent No.: US 12,302,913 B2
(45) Date of Patent: May 20, 2025

(54) HEIGHT ADJUSTABLE POULTRY SHACKLE

(71) Applicant: Foodmate B.V., Numansdorp (NL)

(72) Inventors: David Scott Hazenbroek, Klaaswaal (NL); Juul Floris Van Den Berg, Roosendaal (NL)

(73) Assignee: Foodmate B.V., Numansdorp (NL)

( * ) Notice: Subject to any disclaimer, the term of this patent is extended or adjusted under 35 U.S.C. 154(b) by 99 days.

(21) Appl. No.: 17/427,828

(22) PCT Filed: Feb. 7, 2020

(86) PCT No.: PCT/NL2020/050068
§ 371 (c)(1),
(2) Date: Mar. 21, 2022

(87) PCT Pub. No.: WO2020/162753
PCT Pub. Date: Aug. 13, 2020

(65) Prior Publication Data
US 2022/0142188 A1    May 12, 2022

(30) Foreign Application Priority Data

Feb. 8, 2019  (NL) ..................................... 2022549

(51) Int. Cl.
*A22C 21/00*    (2006.01)

(52) U.S. Cl.
CPC ................................ *A22C 21/0007* (2013.01)

(58) Field of Classification Search
CPC ............ A22C 21/0007; A22C 21/0046; A22C 21/0053

(Continued)

(56) References Cited

U.S. PATENT DOCUMENTS 1,796,739 A * 3/1931 Williams ........... A22C 21/0046
452/67
5,487,700 A * 1/1996 Dillard ............... A22C 21/0007
452/179

(Continued)

FOREIGN PATENT DOCUMENTS

CN        201947865 U    8/2011
CN        205433198 U    8/2016

(Continued)

OTHER PUBLICATIONS

International Search Report in PCT/NL2020/050068 dated May 6, 2020.

*Primary Examiner* — Richard T Price, Jr.
(74) *Attorney, Agent, or Firm* — Michael Best & Friedrich LLP

(57) ABSTRACT

A poultry shackle and a method and system for adjusting a height of a poultry shackle. The shackle includes a carrier having a bore, a shaft extending through the bore, wherein the shaft is movable relative to the carrier along an axial direction of the bore, and a retainer, movable relative to the carrier at an angle, such as substantially perpendicular to. the axial direction. The retainer is movable between a first and second position. In the first position the retainer engages the shaft for maintaining the shaft in a predetermined axial position relative to the carrier. In the second position the retainer releases the shaft for allowing axial movement of the shaft relative to the carrier.

21 Claims, 9 Drawing Sheets

(58) Field of Classification Search
USPC ................................ 452/178, 185, 188, 189
See application file for complete search history.

(56) References Cited

U.S. PATENT DOCUMENTS

| | | | | |
|---|---|---|---|---|
| 6,179,701 | B1 * | 1/2001 | Tieleman | A22C 21/0053 452/179 |
| 6,764,393 | B1 * | 7/2004 | Hazenbroek | A22C 21/0053 452/188 |
| 6,811,480 | B2 * | 11/2004 | Moriarty | A22C 21/0007 452/187 |
| 8,678,176 | B2 * | 3/2014 | Hazenbroek | A22C 21/0053 198/375 |
| 2005/0037705 | A1 * | 2/2005 | Beeksma | A22C 21/0053 452/178 |

FOREIGN PATENT DOCUMENTS

| | | | |
|---|---|---|---|
| EP | 2168452 | A1 | 3/2010 |
| GB | 2489530 | A | 10/2012 |

\* cited by examiner

HEIGHT ADJUSTABLE POULTRY SHACKLE

FIELD OF THE INVENTION

The present invention relates to a height adjustable poultry shackle, and a method and system for adjusting a height of a poultry shackle.

BACKGROUND TO THE INVENTION

Height adjustment of poultry shackles in a poultry processing systems are known. Height adjustment can be desired e.g. for aligning a poultry part, such as a leg, relative to a cutting and/or deboning device. Known height adjustment can be cumbersome. Also, manufacture of known height adjustment systems can be cumbersome.

SUMMARY OF THE INVENTION

An object of the invention is to provide an improved poultry shackle height adjustment, height adjustment system and method.

According to an aspect is provided a poultry shackle including a carrier and a shaft. The carrier is arranged to be attached to a conveyor system, e.g. an overhead conveyor system, such as a chain system. The carrier has a bore. The shaft extends through the bore. The shaft is movable relative to the carrier along an axial direction of the bore and the shaft. The poultry shackle further includes a retainer. The retainer is movable relative to the carrier and/or the shaft. The retainer can be movable at an angle relative to the axial direction. The retainer can e.g. be movable substantially perpendicular to the axial direction. The retainer is movable between a first position and a second position. In the first position, the retainer engages the shaft for maintaining the shaft in a predetermined axial position relative to the carrier. In the second position, the retainer releases the shaft for allowing axial movement of the shaft relative to the carrier. Therefore, the retainer can effectively operate as a lock, selectively engaging or releasing the shaft. This provides the advantage that the shaft can be freely positioned in the axial direction but can also be maintained in the desired position.

Optionally, the retainer and the shaft have meshing surface structures. Hence, the shaft can be secured against unintentional axial movement when the retainer is in the first position. The shaft can include a key, e.g. inserted in a keyway. The key of the shaft can be provided with the meshing surface structure. The meshing surface structures can e.g. include meshing teeth, a plurality of meshing grooves and ridges. It will be appreciated that a pitch of the meshing structures in the axial direction of the shaft can determine a discrete step size in which the shaft can be axially positioned relative to the carrier.

Optionally, the meshing surface structures are formed by screw thread. The shaft can have an external screw thread and the retainer can have an, at least partial, internal screw thread. It will be appreciated that the screw thread provides a surface structure that can be manufactured economically. Preferably, the retainer has an internal screw thread that is partially broken away, so as to allow the retainer to be moved from the first to the second position.

Optionally, the retainer is biased towards the first position. Hence, the shaft is by default maintained in the axial position. Actively moving the retainer from the first position to the second position against the biasing force will allow axial movement of the shaft.

Optionally, the retainer is actuatable from outside the carrier. Hence capture or release of the shaft by the retainer can easily be achieved.

Optionally, the retainer is slidable in a direction perpendicular to the axial direction of the shaft. The retainer can e.g. include an aperture through which the shaft extends. The aperture can, at least at one side, include the surface structure, such as the internal screw thread. The retainer can e.g. project from the carrier so as to allow direct mechanical actuation of the retainer from outside the carrier. Hence a sturdy, easy to manufacture and easy to actuate retainer can be provided.

Optionally, the shaft includes at least one hook for suspending a poultry part, such as a hip joint, knee joint or ankle joint therefrom.

Optionally, the shaft is rotatable relative to the carrier. Hence the at least one hook can be rotated relative to the carrier, and thus relative to the conveyor system, for allowing processing of the suspended poultry part on multiple sides.

Optionally, the shaft includes two hooks, e.g. for suspending a left and a right leg, side by side. Optionally, the shackle includes a fork mounted to shaft, and including two hooks for suspending a poultry part therefrom, the two hooks being mounted to the fork. Hence, two legs can be suspended from the shackle. The two hooks can be horizontally offset relative to the shaft. As the height of the two hooks is adjusted simultaneously, it may be preferred to load the shackle having two hooks with the right and left leg of a single animal. Hence, minimal length differences between the two legs are to be expected.

Optionally, the fork is mounted to shaft such that rotation of the fork relative to the shaft about the longitudinal axis of the shaft is prevented. Hence, any movement of the shaft is simply followed by the fork, and hence by the hooks. Optionally, the two hooks are mounted to the fork such that they are positioned behind each other when the shackle is moved in the conveying direction. Hence, two legs suspended from the two hooks can consecutively pass processing stations in a poultry leg processing system. Optionally, the shaft is rotatable around its axial direction for rotating the pair of hooks, e.g. by rotating the fork.

Optionally, one or each of the hooks is rotatable individually, for rotating the one hook relative to the other hook of the pair. Optionally, the two hooks are individually rotatable about a substantially vertical axis relative to the fork. Hence, the hooks, and the leg part suspended therefrom can be freely rotationally positioned for processing of the leg.

Optionally, the fork is mounted to shaft rotatable about an axis orthogonal to the longitudinal axis of the shaft. Hence, the fork and the hooks attached thereto can be swiveled, e.g. so as to move the legs sideways relative to the axis of the shaft According to an aspect is provided a height adjustment system for adjusting a height of a poultry shackle. The system includes a conveyor system. The conveyor system includes one or more shackles as described herein. The carrier of the shackle is attached to the conveyor system. The system further includes an actuator system for moving the retainer from the first position to the second position, and vice versa. The system further includes a lifting system, arranged for lifting or lowering the shaft relative to the carrier.

Optionally, the lifting system includes at least one guide rail, and the shaft includes at least one guide member, such as a roller, arranged to contact the guide rail for lifting or lowering the shaft relative to the carrier. While the retainer is in the second position, the shaft is free to move relative to the carrier in the axial direction, thus then the guide member can freely follow the guide rail. Hence the height of the shaft relative to the carrier can be adjusted.

Optionally the at least one guide rail is movable for adjusting a lifting or lowering height. Hence, an amount of movement of the shaft relative to the carrier can be set as desired.

Optionally, the actuator system includes a pressing rail for pressing an exposed portion of the retainer for moving the retainer to the second position. Hence, release of the shaft can easily be achieved.

According to an aspect is provided a method for adjusting a height of a poultry shackle. The method includes providing a conveyor system from which depend one or more shackles as described herein. The method includes having the shackles pass a lifting station. The method includes at the lifting station moving the retainer from the first position to the second position and lifting or lowering the shaft relative to the carrier.

Optionally, the lifting station includes at least one guide rail, and the shaft includes at least one guide member. Then the method can include having the guide rail contact the guide member; moving the retainer to the second position for releasing the shaft for allowing axial movement of the shaft relative to the carrier; lifting or lowering the shaft relative to the carrier by means of the guide member following the guide rail; and moving the retainer to the first position for maintaining the shaft in a predetermined axial position relative to the carrier. Hence, a simple and reliable lifting or lowering of the shaft can be achieved.

Optionally, the method includes adjusting a lifting or lowering height.

It will be appreciated that all features and options mentioned in view of the shackle apply equally to the system and the method. It will also be clear that any one or more of the above aspects, features and options can be combined.

BRIEF DESCRIPTION OF THE DRAWINGS

Embodiments of the present invention will now be described in detail with reference to the accompanying drawings in which.

DETAILED DESCRIPTION

Figure 1:
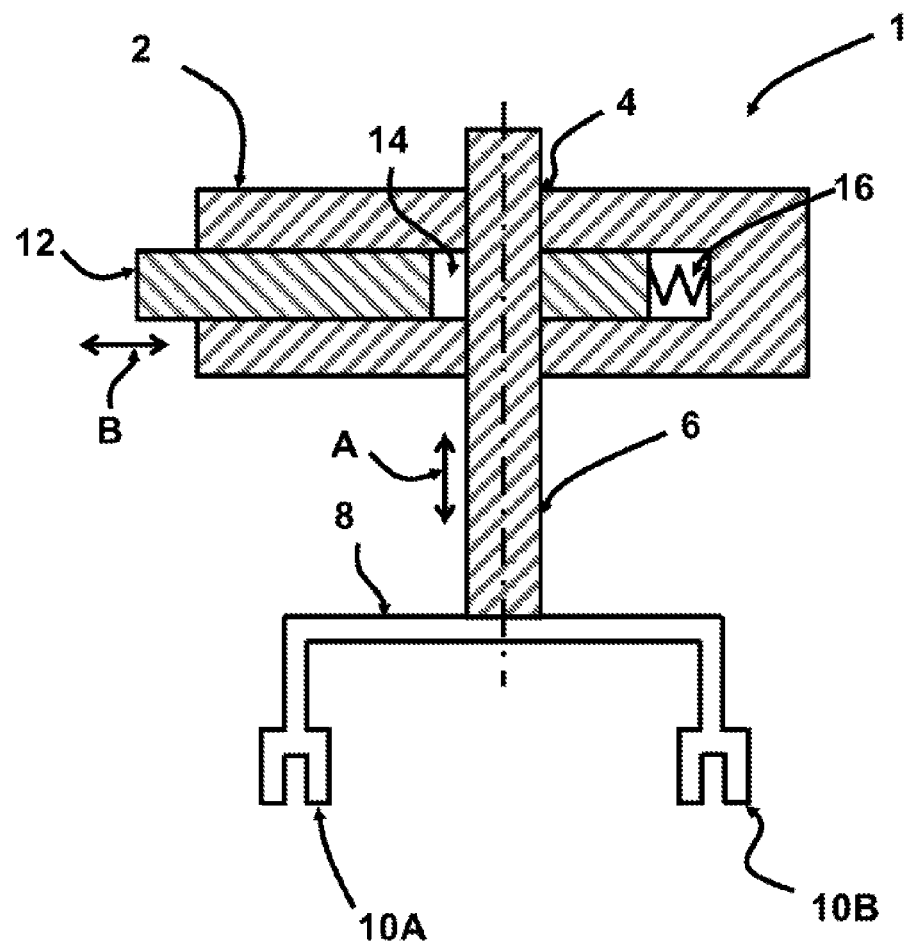
FIG. 1 is a schematic representation of a shackle.
Figure 2:
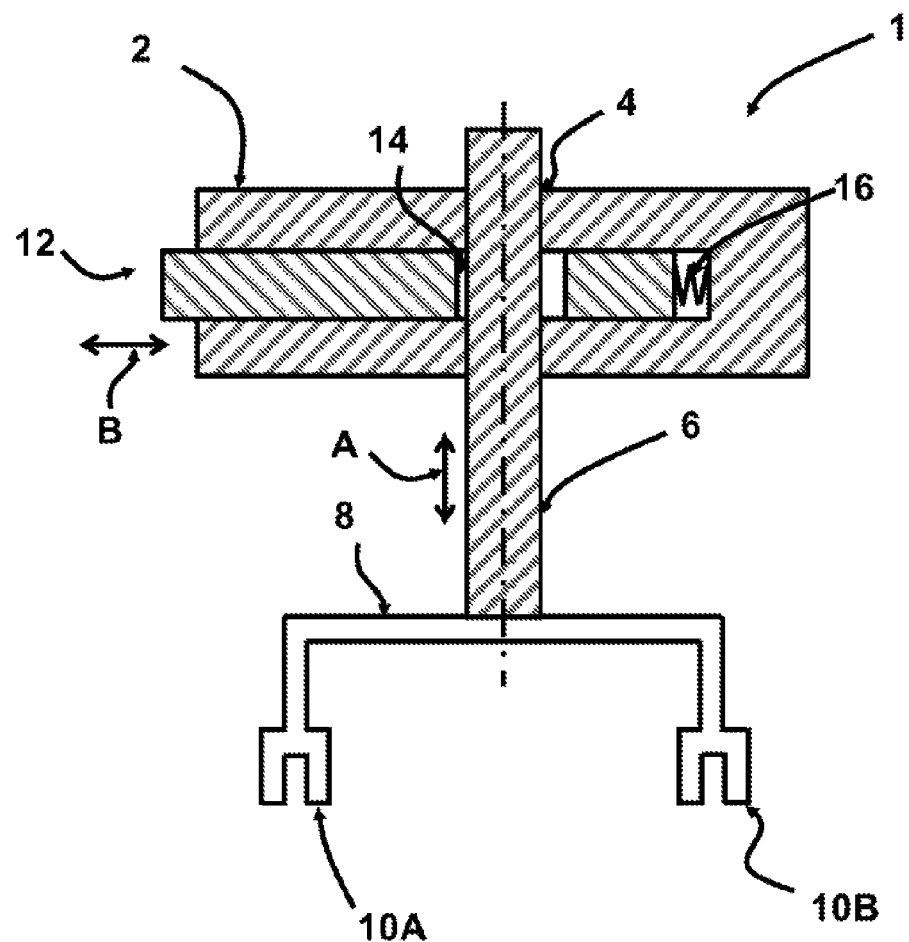
FIG. 2 is a schematic representation of a shackle.

FIGS. 1 and 2 show a schematic representation of a shackle 1. The shackle includes a carrier 2 arranged to be attached to, or part of, a conveyor system for moving the shackle along one or more processing stations. The conveyor system can e.g. move the shackle along a cutting system and/or along a deboning system. The carrier 2 has a bore 4. Here the bore goes through the entire carrier 2. The shackle 1 further includes a shaft 6. In this example, the shaft, at its lower end, is provided with a fork 8 and two hooks 10A, 10B. Here, the fork 8 is fixedly mounted to shaft 2 such that rotation of the fork relative to the shaft about the longitudinal axis of the shaft is prevented. The hooks are arranged for suspending a poultry part, such as a hip joint, knee joint or ankle joint therefrom. The shaft 6 extends through the bore 4. The shaft 6 is movable relative to the carrier 2 along an axial direction A of the bore 4 and the shaft 6.

The shackle 2 further includes a retainer 12. In this example the retainer 12 is slidably contained in the carrier 2. Here the retainer 12 can slide in a direction B perpendicular to the axial direction A. It will be appreciated, however, that it is not necessary that the retainer moves perpendicular to the axial direction A. In general, the retainer 12 is movable relative to the carrier 2 at an angle to the axial direction A. In this example, the retainer 12 includes an aperture 14. The shaft 6 here also extends through the aperture 14. The retainer 12 is movable between a first position and a second position.

The first position is shown in FIG. 1. In the first position, the retainer 12 engages the shaft 6 for maintaining the shaft 6 in a predetermined axial position relative to the carrier 2. Here, the retainer is biased in the first position by a resilient element 16, such as a spring, or one or more magnets. The retainer 12 is forced against the shaft 6 by the spring force. Hence, the shaft is maintained in its axial position. The second position is shown in FIG. 2. In this example, in the second position the retainer 12 is actuated against the biasing force. Hence, the shaft 2 extends freely through the aperture 14 in the retainer 12. Hence, in the second position, the retainer 12 releases the shaft 6 for allowing axial movement of the shaft 6 relative to the carrier 2. Therefore, the retainer 12 can effectively operate as a lock, selectively engaging or releasing the shaft 6.

Figure 3:
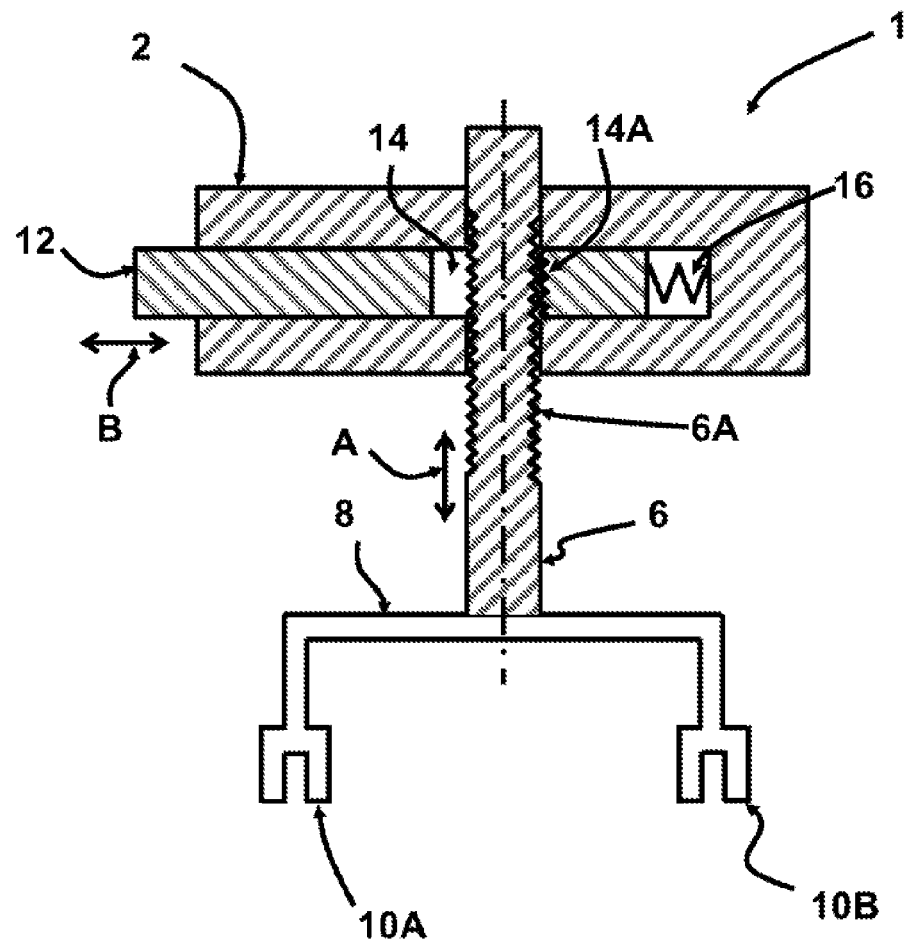
FIG. 3 is a schematic representation of a shackle.
Figure 4:
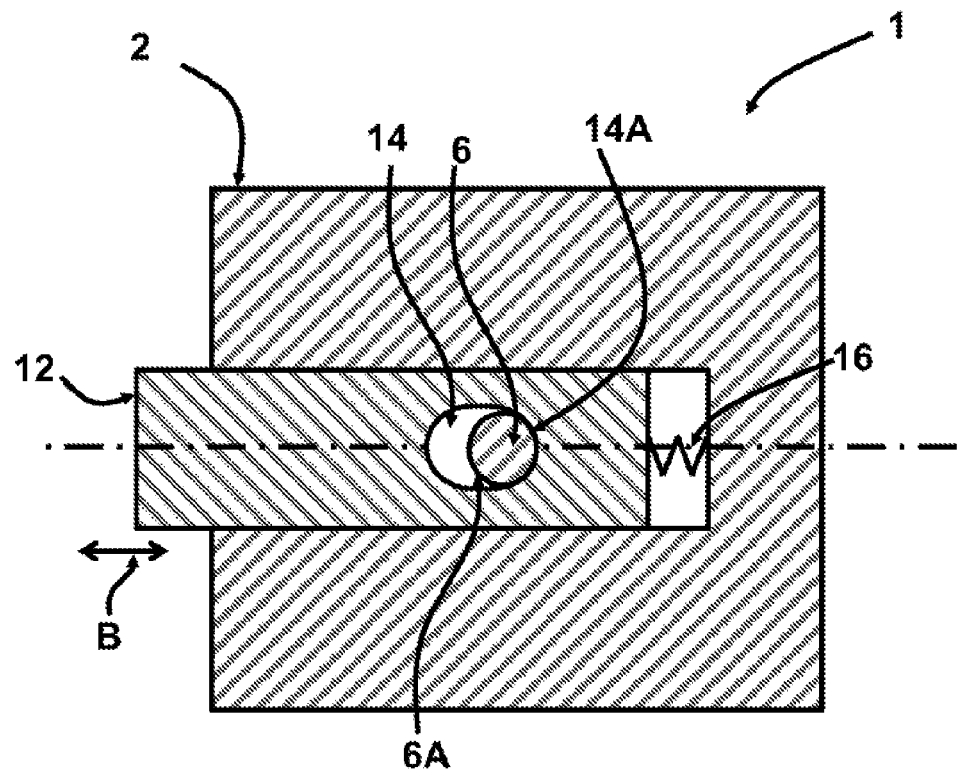
FIG. 4 is a schematic representation of a shackle.

FIG. 3 shows a variation of the shackle 1 shown in FIGS. 1 and 2. FIG. 4 shows a schematic representation of a top plan cross section of the shackle 1 of FIG. 3. In this example the retainer 12 and the shaft 6 have meshing surface structures. Here, the shaft 6 is proved with screw threads 6A along a portion of its length. The retainer 12 is provided with meshing screw threads 14A along a portion of the perimeter of the aperture 14. Hence, the shaft 6 can be secured against unintentional axial movement when the retainer 12 is in the first position. Although in this example the meshing surface structures of the shaft 6 and the retainer 12 are embodied as screw threads, it will be clear that other surface structures are possible. The meshing surface structures can e.g. include a plurality of meshing grooves and ridges. It will be appreciated that a pitch of the meshing structures in the axial direction of the shaft 6 can determine a discrete step size in which the shaft 6 can be axially positioned relative to the carrier 2.

Figure 5:
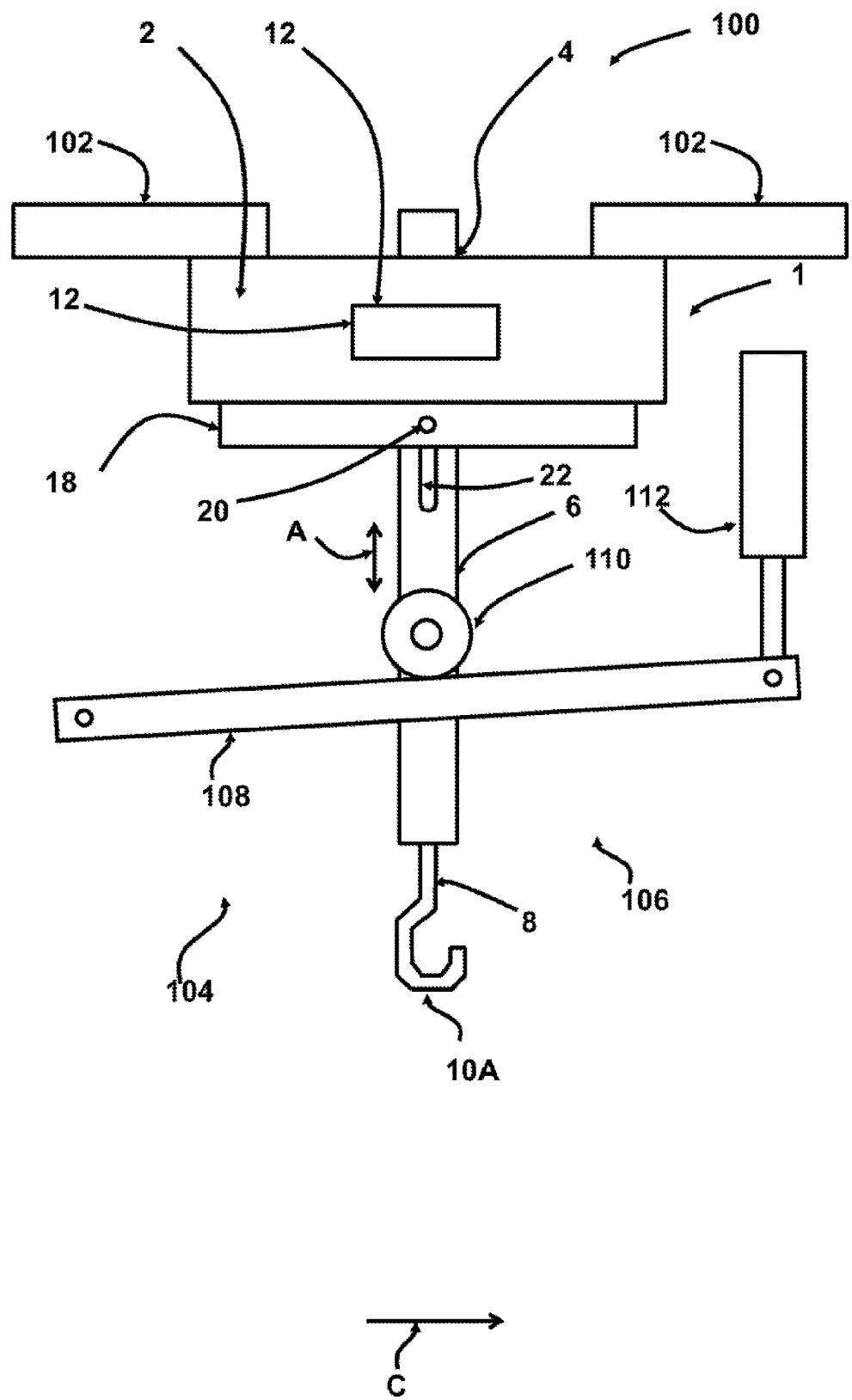
FIG. 5 is a schematic representation of a system.

FIG. 5 shows a schematic representation of a height adjustment system 100. The system 100 includes a conveyor system 102. Here the conveyor system is shown as an overhead conveyor system, such as a chain conveyor system. The conveyor system 102 includes one or more shackles 1. The carrier 2 of the shackle 1 is attached to the conveyor system 102. The conveyor system 102 is arranged for conveying the shackles 1 in a conveying direction C. The system 100 further includes a lifting station 104. The lifting station 104 includes a lifting system 106, arranged for lifting or lowering the shaft 6 relative to the carrier 2.

In this example, the lifting system 106 includes at least one guide rail 108. Here, the shaft 6 includes at least one guide member 110, such as a roller, arranged to contact the guide rail 108 for lifting or lowering the shaft 6 relative to the carrier 2. While the retainer 12 is in the second position, the shaft 6 is free to move relative to the carrier 2 in the axial direction, thus then the guide member 110 can freely follow the guide rail 108. Hence the height of the shaft 6 relative to the carrier 2 can be adjusted.

In this example, the at least one guide rail 108 is movable for adjusting a lifting or lowering height. Here the guide rail can be pivoted around a pivot point. In this example an actuator 112, such as a pneumatic cylinder, is used for adjusting an incline/decline of the guide rail 108. It will be appreciated that the guide rail 108 can decline, be level, or incline in the conveying direction C. Hence, an amount of movement of the shaft 6 relative to the carrier 2 can be set as desired.

Figure 6:
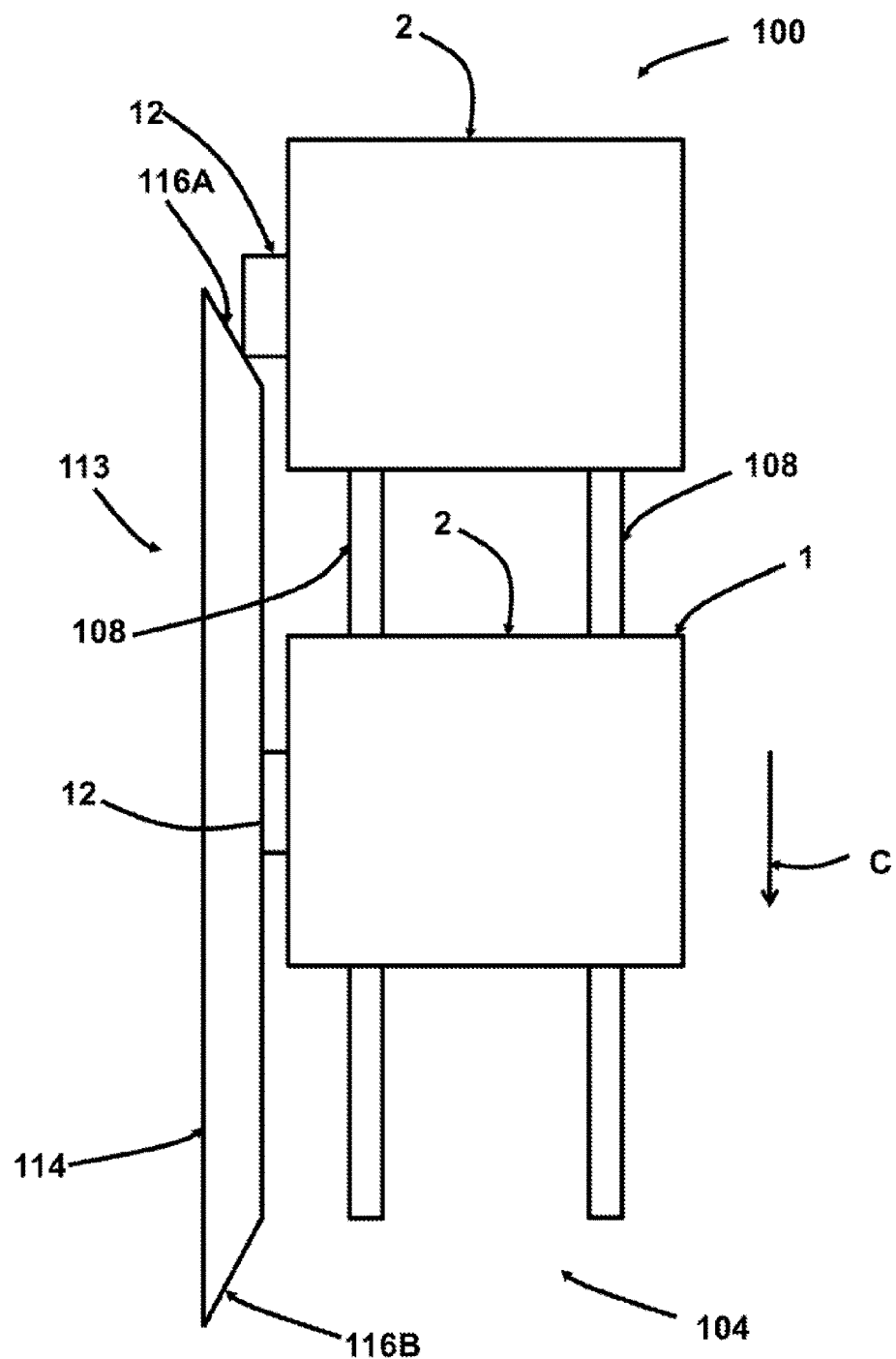
FIG. 6 is a schematic representation of a system.

FIG. 6 shows a top plan view of part of the system 100 of FIG. 5. FIG. 6 shows the shackle 1 over the guide rails 108. In this example two guide rails 108 are shown for selectively lifting or lowering the shaft 6. The lifting station 104 further includes an actuator system 113 for moving the retainer 12 from the first position to the second position, and vice versa. In this example, the actuator system 113 includes a pressing rail 114 for pressing a portion of the retainer 12 that projects from the carrier 2. In this example, the pressing rail 114 has a run-in portion 116A. In FIG. 6, the run-in portion 116A is angled. When the carrier 2, moving in the conveying direction C approaches the run-in portion 116A, the portion of the retainer 12 projecting from the carrier 2 will abut against the run-in portion. As a result, the retainer 12 will be pushed from the first position to the second position. The pressing rail 114 is positioned such that when the carrier 2 moves along the pressing rail 114 in the conveying direction C, the retainer 12 abuts against the pressing rail, e.g. slides along the pressing rail, and is maintained in the second position, e.g. against the biasing force. With the retainer 12 in the second position, the axial position of the shaft can be changed by having the guide member 110 follow the guide rails 108. Here, the pressing rail 114 also includes a run-out portion 116B. When the carrier 2 moves along the run-out portion 116B in the conveying direction, the retainer 12 is gently returned to the first position, hence fixing the axial position of the shaft relative to the carrier.

Returning to FIG. 5, the shackle 1 further includes a turning block 18 for rotating the shaft 6 relative to the carrier 2. The turning block can have the shape of a Maltese cross, as described below. In this example, the turning block transfers rotation thereof to the shaft via a pen 20 and a slot 22 in the shaft 6. Rotation of the turning block can e.g. be implemented in predefined increments. The turning block can e.g. be arranged to rotate in ninety degree increments. It will be appreciated that the rotating of the shaft 6 is optional in the system 100.

Figure 7:
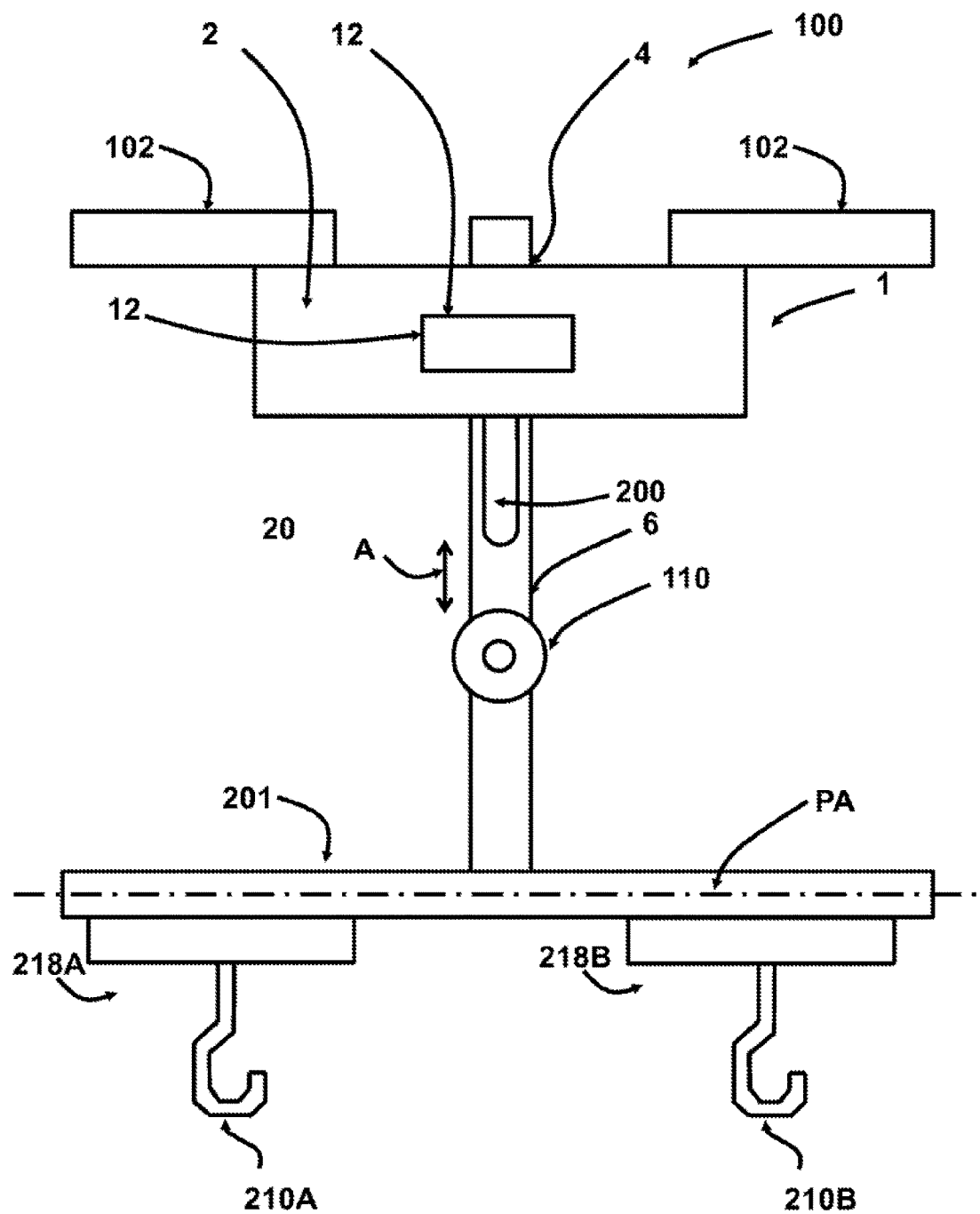
FIG. 7 is a schematic representation of a system.

FIG. 7 shows another schematic representation of a height adjustment system 100. In this example, the shaft 6 comprises a key 200 along at least a portion of its length. The key 200 can be inserted in the shaft in a keyway (a groove in the shaft), as known by the skilled person. Alternatively, the shaft 6 and the key 200 can be made in one piece. Here, the bore 4 in the carrier 2 further comprises a keyway matching the key of the shaft (not shown) so as to prevent the shaft from rotating inside the bore of the carrier.

The key 200 of the shaft can be such that it extends towards the retainer 12 in the carrier 2 when placed inside the carrier. In the first position, the retainer 12 engages the shaft 6 or the key 200 for maintaining the shaft 6 in a predetermined axial position relative to the carrier 2. Here, the retainer is biased in the first position by a resilient element 16, such as a spring, or one or more magnets. In this example, in the second position the retainer 12 is actuated against the biasing force. Hence, the shaft 2 can freely pass by the retainer 12. The retainer 12 can have an aperture through which the shaft extends. The aperture 14 in the retainer 12 can be such that it also comprises a keyway such that, in the second position of the retainer 12, the axial movement of the shaft 6 is made possible, or the aperture shall be big enough such that it does not block the movement of the shaft in the second position.

It will be appreciated that the shaft key 200 can have different shapes such as a square or rectangular cross section. It can also be in the shape of cylinder or a feather key. Furthermore, the corners can be rounded.

In this example, the shaft key 200 comprises teeth along a portion of its length, here on the surface facing radially away from the axis of the shaft. However, it is possible that the key has a smooth surface. Here, the retainer 12 is provided with teeth along a portion of the perimeter of the aperture 14. The teeth of the retainer 12 are positioned and dimensioned to mesh with the teeth of the key 200 in the first position. Hence, the shaft 6 can be secured against unintentional axial movement when the retainer 12 is in the first position. Although in this example the meshing surface structures of the shaft 6 and the retainer 12 are embodied as meshing teeth, it will be clear that other surface structures are possible. The meshing surface structures can e.g. include a partial screw thread, bumps and holes, or the like. In this example, the key prevents the rotation of the shaft within the carrier.

In this example, the fork 8 is embodied as an intermediate body 201. In order to still allow rotation of each hook individually, a turning block 218 for rotating each hook is provided on the intermediate body 201. In this example, the intermediate body 201 is mounted to the shaft such that rotation of the intermediate body about the longitudinal axis of the shaft is prevented. Here, the two hooks 10A, 10B are mounted to the intermediate body 201, such that they are positioned behind each other when the shackle is moved in the conveying direction C. Hence, two legs suspended from the two hooks 10A, 10B can consecutively pass processing stations in a poultry leg processing system.

As illustrated in FIG. 7, at the end of the shaft 6, the intermediate body 201 is attached to the shaft 6. The intermediate body 201 corresponds to the fork 8, and thus on each side of the intermediate plate, a hook is attached to it. In order to allow rotation of each hook 10A and 10B individually, the hooks are attached to the intermediate body through turning blocks 218A and 218B for rotating each hook with respect to the intermediate body 201. In an example, the turning blocks 218A, 218B can have the shape of a Maltese cross, essentially having a square shape with slots extending diagonally inwards from, e.g. all four, corners. Rotation of the Maltese cross can be achieved by a stationary pen positioned to be caught by such slot while the turning block passes the pen, as is per se known in the art. Rotation of the turning block can e.g. be implemented in predefined increments. The turning block can e.g. be arranged to rotate in ninety degree increments. It will be appreciated that the rotating of the hook is optional in the system 100.

The intermediate body 201 can have different configurations. An example is shown in FIGS. 8A and 8B. FIGS. 8A and 8B are top views of the intermediate plate 201 and the shaft 6. The end of the shaft is fixed to the intermediate body such that the intermediate plate can pivot about an axis PA perpendicular to the longitudinal axis of the shaft and parallel to an axis joining the two hooks 210A and 210B. The pivoting can be activated by external means.

The intermediate body 201 preferably comprises a slot 203 in which the shaft 6 is inserted, e.g. at or near its end. In this example, the shaft 6 is fixed in the slot 203 of the intermediate body 201 by means of a pivoting axle 202. The dimensions of the slot 203 are such that the intermediate body 201 can pivot about the shaft 6.

In FIG. 8A, the intermediate body 201 is shown in a first position with respect to the shaft 6, which corresponds to the position shown in FIG. 7. In FIG. 8B, the intermediate body 201 is in a second position with respect to the shaft 6. The intermediate body 201 is pivoted with respect to the shaft by an angle about the axis PA. In this example, the angle of rotation is in the range of 0 to 90 degrees. The hooks 210A and 210B and the turning blocks 218A and 218B are not shown in FIGS. 8A and 8B for the sake of clarity.

The shackle 1 and the system 100 as described above can be used as follows in a method for adjusting a height of a shackle. The method includes having the shackles pass the lifting station 104. At the lifting station 104 the retainer 12 is moved from the first position to the second position the shaft 6 is lifted or lowered relative to the carrier 2.

Figure 9:
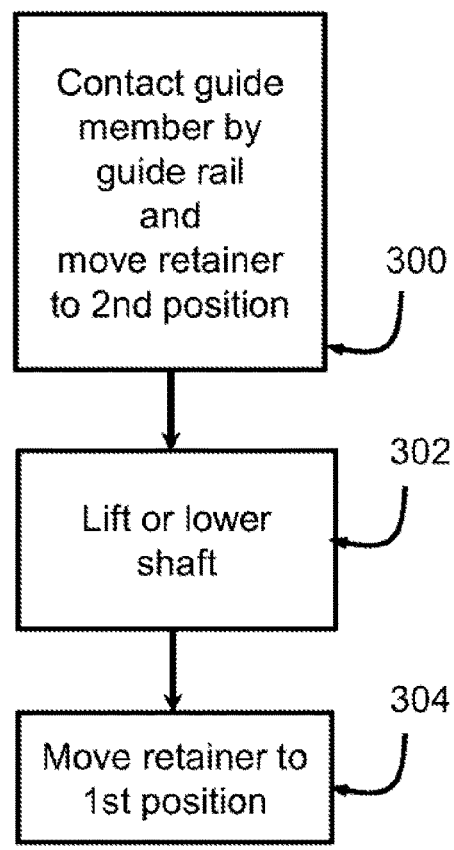
FIG. 9 is a schematic representation of a method.

The method is illustrated schematically in FIG. 9. The method can include consecutively 1) having the guide rail 108 contact the guide member 110 and moving the retainer 12 to the second position for releasing the shaft 6 for allowing axial movement of the shaft 6 relative to the carrier 2 (300); 2) lifting or lowering the shaft 6 relative to the carrier 2 by means of the guide member 110 following the guide rail 108 (302); and 3) moving the retainer 12 to the first position for maintaining the shaft 6 in a predetermined axial position relative to the carrier 2 (304). Optionally, the lifting or lowering height can be adjusted using the actuator 112.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

For example, in the examples of FIGS. 1-4, 7, 8A and 8B the shackle includes two hooks 10A, 10B. Although not shown, in the example of FIGS. 5 and 6 the shackle may also include two hooks. The two hooks can for example be arranged for holding a left and a right poultry leg, respectively. As the height of the two hooks is adjusted simultaneously, it may be preferred to load the shackle having two hooks with the right and left leg of a single animal. Hence, minimal length differences between the two legs are to be expected. Alternatively, for each of the examples it is possible that the shackle includes a single hook.

In the example of FIGS. 5 and 6, the shaft is rotatable relative to the carrier. It will be appreciated that in the examples of FIGS. 1-4 the shaft can also be rotatable relative to the carrier.

In the examples, the retainer includes an aperture through which the shaft extends. It is also possible that the retainer does not include such aperture. The retainer can for example include a cutout in which the shaft extends. Hence, the retainer can, at least partially, surround the shaft. It is also possible that the retainer does not at least partially surround the shaft. The retainer can for example be positioned next to the shaft, such that in the first position the retainer abuts against the shaft and in the second position the retainer does not contact the shaft.

In the examples, the retainer is slidably movable from the first position to the second position and vice versa. However, also other motions are possible. For example, the retainer can be pivotally movable from the first position to the second position and vice versa.

In the examples, the actuator system for moving the retainer from the first position to the second position is arranged beside the carrier. It will be appreciated that it is also possible that the actuator system is arranged inside, above or below the carrier.

In the examples, the retainer is mechanically actuated to move from the first to the second position. It is also possible that the retainer is actuated in another manner, such as electrically, magnetically, pneumatically, hydraulically, etc. The actuator system can e.g. include a solenoid piston.

Figure 8:
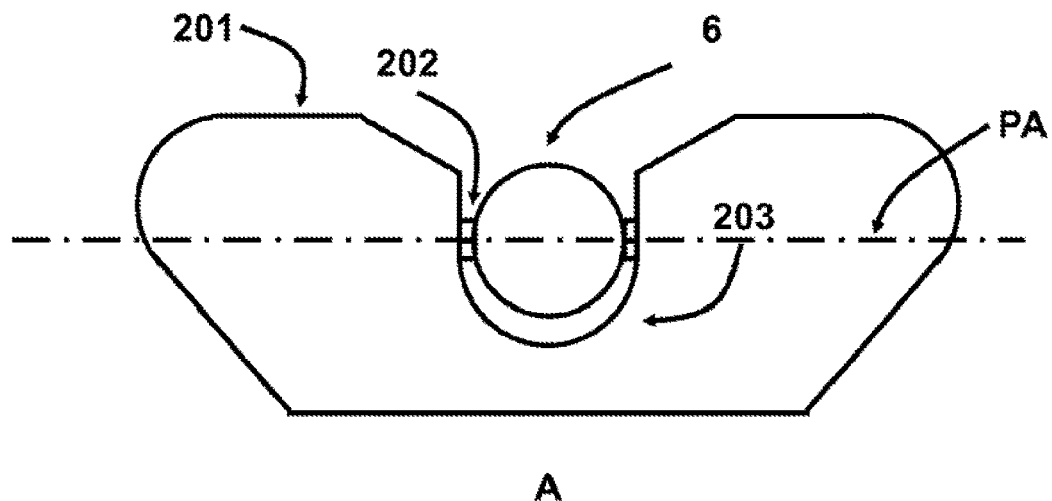
FIG. 8A is a schematic representation of a system.
FIG. 8B is a schematic representation of a system.
Figure 8:
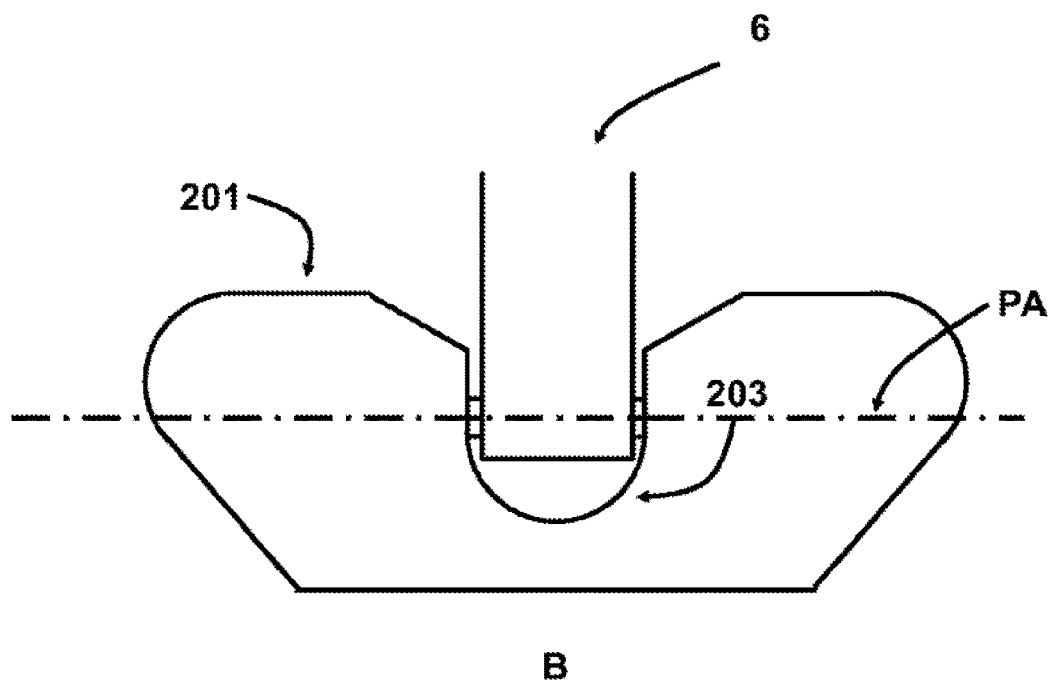

In the example of FIGS. 5 and 6 the shaft 6 can be rotated about the axial direction A. In the examples of FIGS. 7 and 8A-8B means for blocking the rotation of the shaft about the axial direction A are provided such that the shaft remains in the same angular position. It will be appreciated that it is also possible that the shaft can be blocked against rotation in an example further according to FIGS. 1-6. It will be appreciated that it is also possible that the shaft can be rotatable in an example further according to FIGS. 1-4, and 7-8A-8B. It will be appreciated that the key of the shaft of the example of FIGS. 7 and 8A-8B may not prevent rotation of the shaft about the axial direction A if the bore of the carrier is not provided with a matching keyway.

In the examples, the lifting system is arranged underneath the carrier. It will be appreciated that it is also possible that the lifting system is arranged inside or above the carrier.

In the examples, the shaft is mechanically moved up or down, e.g. by a pneumatic piston. It is also possible that the shaft is moved up or down electrically, magnetically, hydraulically, etc. The lifting system can e.g. include a solenoid piston, an electric motor, or the like.

In the examples the two hooks are rigidly connected to the fork. Hence, rotation of the shaft will rotate the two hooks jointly. It will be appreciated that it is also possible that one or both of the two hooks is rotatable relative to the fork.

Instead of hooks also alternative holding means for holding a poultry carcass or part thereof can be provided at the shackle.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference sign placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:
1. A poultry shackle including:
a carrier arranged to be attached to a conveyor system and having a bore;

a shaft extending through the bore, wherein the shaft is movable relative to the carrier along an axial direction of the bore; and a retainer movable relative to the carrier at an angle;

wherein the retainer is slidable in a direction substantially perpendicular to the axial direction of the bore between a first position and a second position, wherein in the first position, the retainer engages the shaft for maintaining the shaft in a predetermined axial position relative to the carrier, and wherein in the second position, the retainer disengages from the shaft for allowing axial movement of the shaft relative to the carrier.

2. The poultry shackle of claim 1, wherein the retainer and the shaft each comprise meshing surface structures.

3. The poultry shackle of claim 1, wherein the shaft includes a key.

4. The poultry shackle of claim 1, wherein the shaft has an external screw thread and the retainer has at least a partial internal screw thread.

5. The poultry shackle of claim 1, wherein the shaft comprises a meshing surface structure that includes a plurality of teeth and the retainer comprises a meshing surface structure that includes a plurality of teeth.

6. The poultry shackle of claim 1, wherein the retainer is biased towards the first position.

7. The poultry shackle of claim 1, wherein a portion of the retainer is actuatable from outside the carrier.

8. The poultry shackle of claim 1, wherein the shaft includes at least one hook configured for suspending a poultry part therefrom.

9. The poultry shackle of claim 1, further comprising a fork mounted to the shaft, the fork including two hooks mounted thereto and configured for suspending a poultry part from the fork.

10. The poultry shackle of claim 9, wherein the fork is mounted to the shaft such that rotation of the fork relative to the shaft about a longitudinal axis of the shaft is substantially prevented.

11. The poultry shackle of claim 10, wherein the two hooks are individually rotatable about a substantially vertical axis relative to the fork.

12. The poultry shackle of claim 10, wherein the fork is mounted to the shaft rotatable about an axis orthogonal to the longitudinal axis of the shaft.

13. The poultry shackle of claim 1, wherein the shaft is rotatable relative to the carrier.

14. A height adjustment system for adjusting a height of a poultry shackle, including:

a conveyor system from which one or more poultry shackles depend, each of the poultry shackles comprising:

a carrier attached to the conveyor system and having a bore;

a shaft extending through the bore, wherein the shaft is movable relative to the carrier along an axial direction; and a retainer movable relative to the carrier at an angle;

wherein the retainer is movable between a first position and a second position, wherein in the first position, the retainer engages the shaft for maintaining the shaft in a predetermined axial position relative to the carrier, and wherein in the second position, the retainer disengages from the shaft for allowing axial movement of the shaft relative to the carrier;

an actuator system for moving the retainer from the first position to the second position; and a lifting system arranged adjacent the carrier and configured for lifting or lowering the shaft relative to the carrier.

15. The system of claim 14, wherein the lifting system includes at least one guide rail, and the shaft includes at least one guide member arranged to contact the guide rail for lifting or lowering the shaft relative to the carrier.

16. The system of claim 15, wherein the guide member includes a roller.

17. The system of claim 15, wherein the at least one guide rail is movable for adjusting a lifting or lowering height of the shaft.

18. The system of claim 14, wherein the actuator system includes a pressing rail configured to press against an exposed portion of the retainer for moving the retainer to the second position.

19. A method for adjusting a height of a poultry shackle, including:

moving one or more shackles along a conveyor system, each of the shackles comprising:

a carrier attached to the conveyor system;

a shaft extending through the carrier and being movable relative to the carrier along an axial direction; and a retainer movable relative to the carrier at an angle;

wherein the retainer is movable between a first position whereby the retainer engages the shaft for maintaining the shaft in a predetermined axial position relative to the carrier, and a second position whereby the retainer releases disengages from the shaft for allowing axial movement of the shaft relative to the carrier;

moving the shackles past a lifting station; and as the shackles pass the lifting station, moving the retainer from the first position to the second position and lifting or lowering the shaft relative to the carrier.

20. The method of claim 19, wherein the lifting station includes at least one guide rail, and the shaft includes at least one guide member, and wherein the method further comprises:

contacting the guide rail with the guide member;

moving the retainer to the second position for releasing the shaft and enable axial movement of the shaft relative to the carrier;

lifting or lowering the shaft relative to the carrier by the guide member following the guide rail; and moving the retainer to the first position for maintaining the shaft in a predetermined axial position relative to the carrier.

21. The method of claim 19, further including adjusting a lifting or lowering height of the shaft.

* * * * *